July 16, 1935.  C. A. SAWTELLE  2,008,425
CONTROL MEANS FOR VEHICLE BRAKES
Filed Feb. 16, 1931
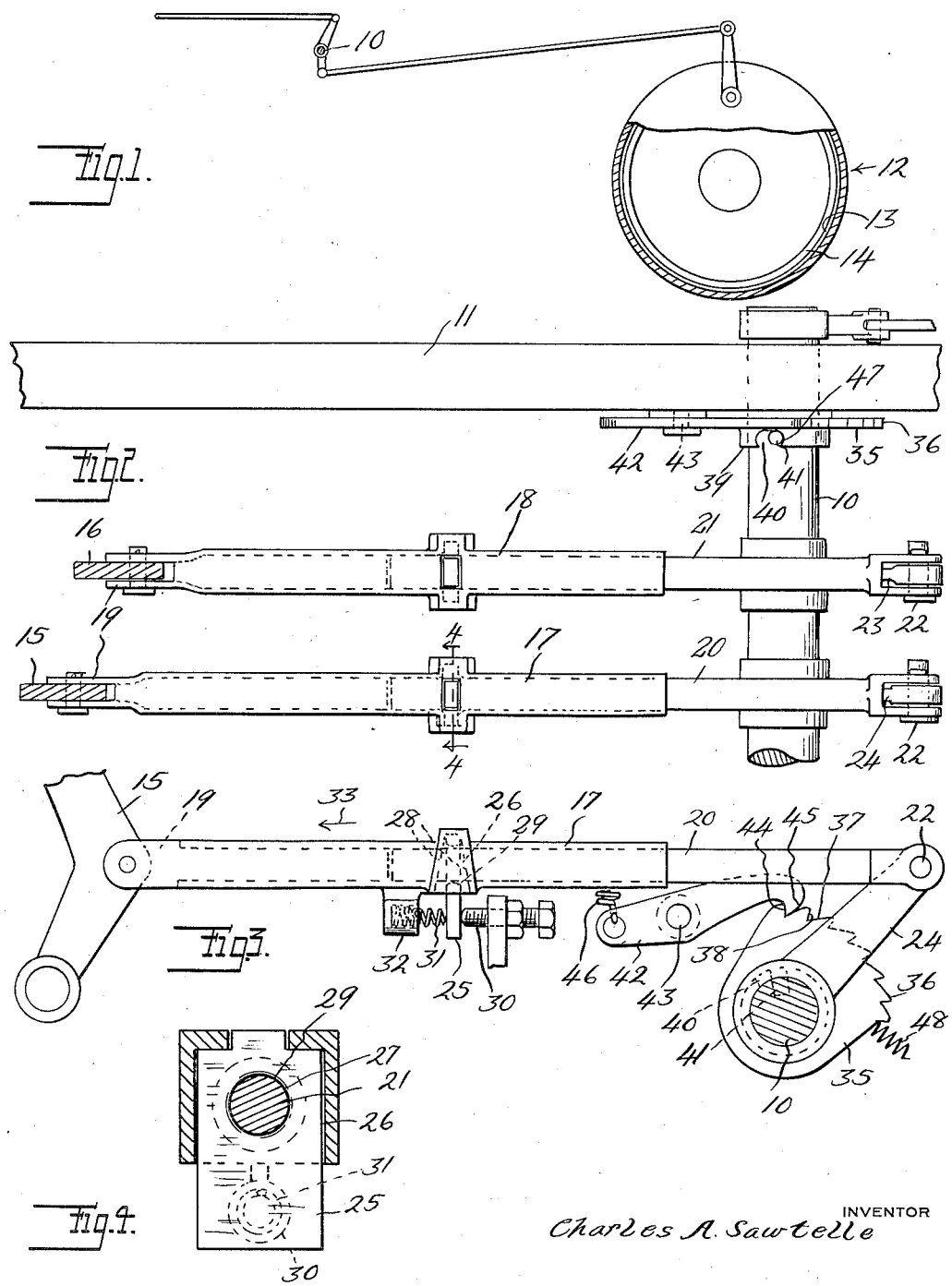

Patented July 16, 1935

2,008,425

UNITED STATES PATENT OFFICE 2,008,425

CONTROL MEANS FOR VEHICLE BRAKES

Charles A. Sawtelle, Detroit, Mich., assignor, by direct and mesne assignments, to S. and D. Engineering Company, Detroit, Mich., a corporation of Michigan Application February 16, 1931, Serial No. 516,182

5 Claims. (Cl. 188—196)

This invention relates generally to control means and refers more particularly to improved means for controlling as well as adjusting vehicle wheel brakes.

One of the objects of this invention is to provide means operable in dependence upon a predetermined increase in clearance between the relatively movable braking surfaces for adjusting the latter to compensate for wear of the same.

Another object of this invention resides in the provision of adjusting means operable upon manipulation of the brake control means for automatically maintaining a substantially predetermined clearance between the relatively movable braking surfaces.

Another advantageous feature of this invention is to provide control means comprising a rockshaft operatively connected to the brakes and means for adjusting the rotative position of the shaft corresponding to brake releasing position in dependence upon a predetermined increase in the clearance between the relatively movable braking surfaces.

A further object of this invention is to provide a rockshaft of the type specified operated by a control element having a lost motion connection therewith permitting rotative adjustment of the same without interfering with the control element.

A still further object of this invention resides in the provision of a plurality of separate control elements independently connected to a common rockshaft for actuating the same by lost motion connections whereby said shaft may be rocked by either of the control elements without interfering with the other.

The foregoing as well as other objects will be made more apparent as this description proceeds, especially when considered in connection with the accompanying drawing, wherein:

Figure 1 is a diagrammatic elevational view of a portion of a vehicle brake system;

Figure 2 is a plan view of my improved brake control means;

Figure 3 is a side elevation of the construction shown in Figure 2; and

Figure 4 is a sectional view taken substantially on the line 4—4 of Figure 2.

Referring now more in detail to the drawing, it will be noted that there is illustrated diagrammatically in Figure 1 a portion of a vehicle brake system comprising a rockshaft 10 extending transversely of the vehicle frame 11 and having the end portions journaled upon the side sills of the frame. The rockshaft 10 is operatively connected to the brakes of the vehicle, one of which is designated in Figure 1 by the reference numeral 12 and as shown is preferably of the internal expanding type having a circular interior braking surface 13 for engagement with the brake shoe 14 which is normally spaced a predetermined distance from the braking surface. As is usually the case, the brake shoes are operatively connected to a rockshaft in such a manner that rocking movement of the latter in one direction effects a movement of the shoes into frictional engagement with the braking surface.

For rocking the shaft 10 to effect an operation of the brakes, I provide two separate controls 15 and 16. The control 15 is in the form of a foot actuated pedal commonly referred to in the art as a service brake, while the control 16 is in the form of a lever usually conveniently arranged within the driver's compartment of the vehicle for manipulation by the hand of the operator. As shown particularly in Figure 2, both the controls are connected to the rockshaft in such a manner as to operate the latter independent of each other. In detail, the means for independently connecting the controls 15 and 16 to the rockshaft 10 comprises a pair of tubular members 17 and 18 having bifurcated end portions 19 respectively pivotally secured to the controls 15 and 16. The opposite end portions of the tubular members 17 and 18 telescope a pair of rods 20 and 21, respectively, having the rear ends pivotally secured as at 22 to a pair of levers 23 and 24 which in turn are rigidly secured to the rockshaft in axial spaced relation. Relative sliding movement of the telescopically engaging members is controlled by a suitable clutch 25 mounted within each of the tubular members 17 and 18. As shown particularly in Figure 3, the clutch members 25 are mounted within suitable slots 26 extending transversely of the tubular members aforesaid and are formed with openings 27 therethrough for receiving the forward end portions of the rods 20. The opposite side walls 28 of the slots 26 are flared outwardly to permit tilting of the clutch members 25 and the inner surfaces 29 of the openings 27 in the clutch members through which the forward end portions of the rods project, are so fashioned as to effect a wedging engagement with the rods upon tilting of the clutch members.

In the normal position of the controls or in other words, when the brakes are dis-engaged, the clutch members 25 assume the position shown in Figure 3 wherein the clutch surfaces 29 permit relative sliding movement of the telescopically engaging members. The clutch members 25 are maintained in the above position by means of adjustable stops 30 engaging the rear side of the clutch members 25 and suitable coil springs 31 engaging the opposite sides of the clutch members normally urging the same into contact with the fixed stops 30. The coil springs are carried in suitable extension 32 depending from the tubular members 17 and 18.

Assuming that the parts are in the above positions and the foot pedal 15 is depressed to apply the brake, it will be noted that depression of the foot pedal causes a pull on the tubular member 17 in the direction of the arrow 33. Initial movement of the tubular member 17 in the aforesaid direction exerts a pull on the upper end portion of the clutch member 25 and due to the fact that the spring 31 is tending to maintain the lower portions of the clutch member 25 in engagement with the stop, it will be apparent that the lower portions of the clutch will have a tendency to remain stationary causing the clutch to tilt and wedge the clutch surface 29 into locking engagement with the rod 20. As a consequence, continued movement of the tubular member 17 in the direction of the arrow 33 effects a corresponding movement of the rod 20 and since the rod 20 is secured to the rockshaft, the latter will be operated to apply the brakes. It is to be noted, however, that since the rod 21 is also secured to the rockshaft, movement of the latter by the rod 20 will also effect a forward movement of the rod 21, but since the tubular member 18 and associated clutch has not been disturbed from its normal position wherein the latter clutch permits relative sliding movement of the telescoping members, it will be apparent that the rod 21 will be permitted to slide forwardly within the tubular member without interfering with the latter or control lever connected thereto. The reversal of the above function takes place when the hand brake is operated since manipulation of the latter, while causing forward movement of the rod 20 within the tubular member 17 does not interfere with the position of the latter and associated clutch 25. Thus, from the foregoing it will be obvious that the two controls function independently of each other for actuating the rockshaft to apply the brakes.

As previously stated, it is one of the objects of this invention to provide mechanism for automatically adjusting the brakes upon manipulation of either of the above controls. The above adjustment is accomplished by adjusting the rotative position of the rockshaft corresponding to brake releasing position in dependence upon a predetermined increase in the clearance between the braking surface and brake band. In detail, a ratchet segment 35 is provided having teeth 36 arranged on a common pitch diameter and having gradually tapered surfaces 37 terminating in shoulders 38. The ratchet segment 35 is provided with a hub 39 sleeved upon the rockshaft 10 for rocking movement relative thereto and an arcuate slot 40 of predetermined length is formed in the hub for engaging a pin 41 secured to the rockshaft 10. The arrangement is such as to permit a limited relative movement of the ratchet segment 35 and the rockshaft 30. Cooperating with the ratchet teeth 36 is a suitable pawl 42 pivotally mounted intermediate the ends thereof as at 43 to a stationary support and having a shoulder 44 at one end adapted to engage the cooperating shoulders 38 on the teeth 36. The end aforesaid of the pawl is further provided with a cam surface 45 adjacent the shoulder 44 for engaging the cam surfaces 37 of the teeth and is normally held into engagement with the teeth by means of a spring 46 having one end secured to the opposite end of the pawl and the other end secured to a suitable fixed support.

The rear wall 47 of the slot 40 is normally maintained into engagement with the pin by means of a suitable spring 48 having one end secured to the ratchet and the opposite end secured to a relatively fixed support. The construction is such as to permit initial rocking movement of the shaft 10 to apply the brakes by either of the controls without effecting a corresponding rocking movement of the ratchet segment 35. The length of the slot 40 is so determined as to provide for movement of the ratchet segment with the rockshaft a sufficient distance to engage the pawl with the next adjacent tooth on the ratchet when rocking movement of the shaft to brake applying position exceeds a predetermined amount. In other words, as the brakes become worn, the clearance between the braking surface and shoes increases with the result that a correspondingly greater movement of the rockshaft is necessary to apply the brakes. When the extent of movement of the rockshaft necessary to apply the brakes exceeds the length of the slot 40 and the distance of one tooth space, it will be apparent that the ratchet segment 35 will be rotated relative to the pawl causing the cam surface 45 thereof to slide upwardly upon the inclined surface of the tooth with which it is engaged and to drop behind the next adjacent tooth. The arrangement is such that when the brake is released, the ratchet segment will be maintained in its advanced position by the pawl and since the pin 41 on the rockshaft engages within the slot 40 in the ratchet segment, it will be obvious that the return movement of the shaft will be restricted to the length of the slot which corresponds substantially to a predetermined clearance between the shoe and brake flange. In other words, advancing the ratchet one tooth space as stated also advances the brake releasing position of the rockshaft a corresponding amount and owing to the operative connection between the shaft and brake shoe, the retracted position of the latter will be advanced a similar amount effecting a corresponding reduction in the clearance between the braking surfaces of the drum and shoe. It will further be apparent from the preceding description that owing to the lost motion connections between the controls and rockshaft, rotative adjustment of the latter in the manner stated is accomplished without interfering with the controls.

What I claim as my invention is:

1. In combination, a rockshaft operatively connected to a brake, a plurality of separate controls operatively connected to the rockshaft for actuating the latter independent of each other, and adjusting mechanism associated with the rockshaft and operable upon manipulation of either of said controls for maintaining the brake in a predetermined adjusted position.

2. In combination, a brake having a braking surface and a member engageable with said surface, a rockshaft operatively connected to the member for actuating the same and mounted for rocking movement to brake applying and brake releasing positions, means for adjusting the rotative position of said shaft corresponding to brake releasing position in dependence upon a predetermined increase in the clearance between the braking surface and member engageable therewith, and means for rocking the shaft including a control element having a lost motion connection therewith permitting adjustment of the same without interfering with the normal position of the control element.

3. In combination, a brake having a braking surface and a member engageable with said surface, a rockshaft operatively connected to the member for actuating the same and mounted for rocking movement to brake applying and brake releasing positions, means for adjusting the rotative position of said shaft corresponding to brake releasing position in dependence upon a predetermined increase in the clearance between the braking surface and member engageable therewith, said means including a ratchet having a lost motion connection with the shaft, a pawl fixed relative to the ratchet and engageable with the teeth on the latter, and a control element for rocking the shaft having a lost motion connection therewith permitting rotative adjustment of the shaft without affecting the position of the control element.

4. In combination, a brake having a braking surface and a member engageable therewith, a rockshaft operatively connected to the member for actuating the same and mounted for rocking movement to brake applying and brake releasing positions, means for adjusting the rotative position of said shaft corresponding to brake releasing position in dependence upon a predetermined increase in the clearance between the braking surface and member engageable therewith, and a plurality of separate controls for independently actuating the rockshaft having lost motion connections with the latter permitting rotative adjustment of the shaft without interfering with the normal positions of the control elements.

5. In a vehicle brake system, the combination with a brake having a braking surface and a member engageable with said surface, of a rockshaft operatively connected to the member for actuating the same and mounted for rocking movement to brake-applying and brake-releasing positions, a control for rocking said shaft means for adjusting the rotative position of said shaft corresponding to brake-releasing position in dependence upon a predetermined increase in the clearance between the braking surface and member engageable therewith, said means including a ratchet member having a lost motion connection with said rockshaft permitting relative movement therebetween corresponding in extent to a predetermined desired clearance between the braking surface and member engageable therewith, a pawl fixed relative to the ratchet and successively engageable with the teeth on the latter as the distance between the braking surface and member engageable therewith increases, and a connection between said control and rock shaft variable in length in dependence upon the adjustment of the rock shaft to permit said adjustment without interfering with the normal position of the control.

CHARLES A. SAWTELLE.